US011761230B1

(12) United States Patent
Drummond et al.

(10) Patent No.: US 11,761,230 B1
(45) Date of Patent: Sep. 19, 2023

(54) SOLAR POWERED CANOPY SYSTEM AND METHOD OF USE

(71) Applicants: Kendrick Drummond, Houston, TX (US); Yladrea Drummond, Houston, TX (US)

(72) Inventors: Kendrick Drummond, Houston, TX (US); Yladrea Drummond, Houston, TX (US)

( * ) Notice: Subject to any disclaimer, the term of this patent is extended or adjusted under 35 U.S.C. 154(b) by 0 days.

(21) Appl. No.: 17/010,112

(22) Filed: Sep. 2, 2020

(51) Int. Cl.
| | |
|---|---|
| *E04H 15/10* | (2006.01) |
| *E04H 15/16* | (2006.01) |
| *H02S 20/23* | (2014.01) |
| *E04H 15/58* | (2006.01) |
| *H04R 1/02* | (2006.01) |
| *E04H 15/14* | (2006.01) |
| *F21W 131/107* | (2006.01) |

(52) U.S. Cl.
CPC ............ *E04H 15/58* (2013.01); *E04H 15/10* (2013.01); *E04H 15/14* (2013.01); *E04H 15/16* (2013.01); *H02S 20/23* (2014.12); *H04R 1/02* (2013.01); *F21W 2131/107* (2013.01)

(58) Field of Classification Search
CPC ......... E04H 15/58; E04H 15/10; E04H 15/14; E04H 15/16; H02S 20/23
USPC .............................. 135/91, 93, 94, 96, 120.1
See application file for complete search history.

(56) References Cited

U.S. PATENT DOCUMENTS

| | | | | | |
|---|---|---|---|---|---|
| 5,172,711 | A | * | 12/1992 | Mueller ................... | A45B 3/00 135/20.3 |
| 5,273,062 | A | * | 12/1993 | Mozdzanowski ....... | F24S 25/10 248/530 |
| 5,584,564 | A | * | 12/1996 | Phyle .................... | F21V 33/006 135/910 |
| 6,017,188 | A | * | 1/2000 | Benton .................... | A45B 3/00 416/142 |
| 6,325,084 | B1 | * | 12/2001 | Cohen ................... | F04D 25/088 417/313 |
| 6,397,869 | B1 | * | 6/2002 | Jennings ................. | E04H 15/32 135/93 |
| 6,598,990 | B2 | * | 7/2003 | Li ......................... | F21V 17/007 362/800 |
| 6,732,752 | B2 | * | 5/2004 | Cohen ..................... | A45B 3/00 417/313 |
| 6,858,054 | B2 | * | 2/2005 | Page ....................... | F24F 8/158 55/385.2 |
| 7,497,225 | B1 | * | 3/2009 | Klein, Jr. ................ | A45B 3/00 135/118 |
| 7,614,600 | B1 | * | 11/2009 | Smith .................... | G09F 23/00 248/910 |

(Continued)

*Primary Examiner* — Robert Canfield
(74) *Attorney, Agent, or Firm* — Leavitt Eldredge Law Firm

(57) ABSTRACT

A canopy system for providing cooling action and improving user comfort comprising of a canopy having one or more fans, one or more lights, one or more electrical outlets, one or more speakers, one or more solar panels, and at least one alternative power source; the solar panels store and supply solar power to the fans, lights, electrical outlets, and speakers; the fans direct airflow from above the canopy to the area underneath the canopy; the alternative power source stores and supplies electrical energy to the fans, lights, electrical outlets, and speakers if and when solar panels fail to supply solar power to the fans, lights, electrical outlets, and speakers.

4 Claims, 2 Drawing Sheets

(56) References Cited

U.S. PATENT DOCUMENTS

| | | | | |
|---|---|---|---|---|
| 7,703,466 B1* | 4/2010 | Smith | E04H 15/10 | 362/396 |
| 7,974,079 B2* | 7/2011 | Miller | F16M 11/42 | 135/88.13 |
| 8,331,598 B2* | 12/2012 | Li | G09F 27/00 | 381/334 |
| 8,413,671 B2* | 4/2013 | Li | A45B 23/00 | 135/96 |
| 8,851,343 B1* | 10/2014 | Evans | A45B 11/02 | 224/187 |
| 9,088,181 B2* | 7/2015 | Akin | H02J 7/35 | |
| 9,185,988 B1* | 11/2015 | Sanchez | A47C 7/72 | |
| 9,510,653 B2* | 12/2016 | Akin | H02J 50/12 | |
| 9,820,540 B2* | 11/2017 | Pan | A45B 25/143 | |
| 9,968,168 B2* | 5/2018 | Ma | A45B 3/02 | |
| 10,455,395 B2* | 10/2019 | Gharabegian | H05B 45/00 | |
| 10,455,911 B1* | 10/2019 | Sendi | A45B 17/00 | |
| 10,506,854 B2* | 12/2019 | Akin | A47C 7/66 | |
| 10,676,954 B1* | 6/2020 | Oppenheim | E04H 15/14 | |
| 2004/0084071 A1* | 5/2004 | Gray | A45B 3/00 | 135/16 |
| 2005/0161067 A1* | 7/2005 | Hollins | A45B 23/00 | 135/16 |
| 2005/0164627 A1* | 7/2005 | Boone, Jr. | A45B 3/00 | 454/338 |
| 2006/0254636 A1* | 11/2006 | Tung | E04H 15/02 | 135/96 |
| 2006/0272693 A1* | 12/2006 | Wallander | A63B 71/022 | 52/143 |
| 2007/0056617 A1* | 3/2007 | Li | F21V 33/006 | 135/91 |
| 2007/0209694 A1* | 9/2007 | Gooch | E04H 15/10 | 135/91 |
| 2008/0169013 A1* | 7/2008 | Brockel | E04H 15/14 | 135/93 |
| 2008/0190471 A1* | 8/2008 | Tarter | E04H 15/02 | 135/96 |
| 2010/0126545 A1* | 5/2010 | Bullivant | E04H 15/36 | 135/125 |
| 2010/0132751 A1* | 6/2010 | Li | A45B 23/00 | 135/96 |
| 2010/0192999 A1* | 8/2010 | Li | A45B 25/00 | 135/96 |
| 2011/0005560 A1* | 1/2011 | Nair | E04H 15/58 | 135/117 |
| 2011/0265694 A1* | 11/2011 | Portis | H01M 10/465 | 320/101 |
| 2012/0103377 A1* | 5/2012 | Sheridan | E04H 15/58 | 135/96 |
| 2012/0235477 A1* | 9/2012 | Korman | E04H 15/58 | 307/11 |
| 2013/0233364 A1* | 9/2013 | Hotes | E04H 15/02 | 135/96 |
| 2014/0150837 A1* | 6/2014 | Darquea | E04H 15/003 | 135/96 |
| 2014/0366922 A1* | 12/2014 | King | A45B 25/165 | 135/96 |
| 2016/0192747 A1* | 7/2016 | Rossi | H02S 30/20 | 135/16 |
| 2016/0340926 A1* | 11/2016 | Barbret | E04H 15/28 | |
| 2017/0302101 A1* | 10/2017 | Varacek | H02S 20/30 | |
| 2023/0044577 A1* | 2/2023 | De La Fuente Sanchez | B60L 53/30 | |

* cited by examiner

SOLAR POWERED CANOPY SYSTEM AND METHOD OF USE

BACKGROUND

1. Field of the Invention

The present invention relates generally to outdoor structure systems, and more specifically to a canopy system that utilizes solar power to provide cooling action thereunder and improve user comfort.

2. Description of Related Art

Canopy systems are well known in the art and are effective means to provide shade and shelter for users from weather conditions during outdoor activities such as camping, tailgating, picnicking, and the like. Typically, canopy systems incorporate fans to provide ventilation and cooling action for users underneath the canopy. However, many canopy systems power fans through batteries and canopy systems often do not have a backup power supply in the event the power supply in batteries are depleted.

Hence, it would be advantageous to have a canopy system that incorporates solar panels to store and supply energy to fans and other electronic equipment.

Accordingly, although great strides have been made in the area of canopy systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
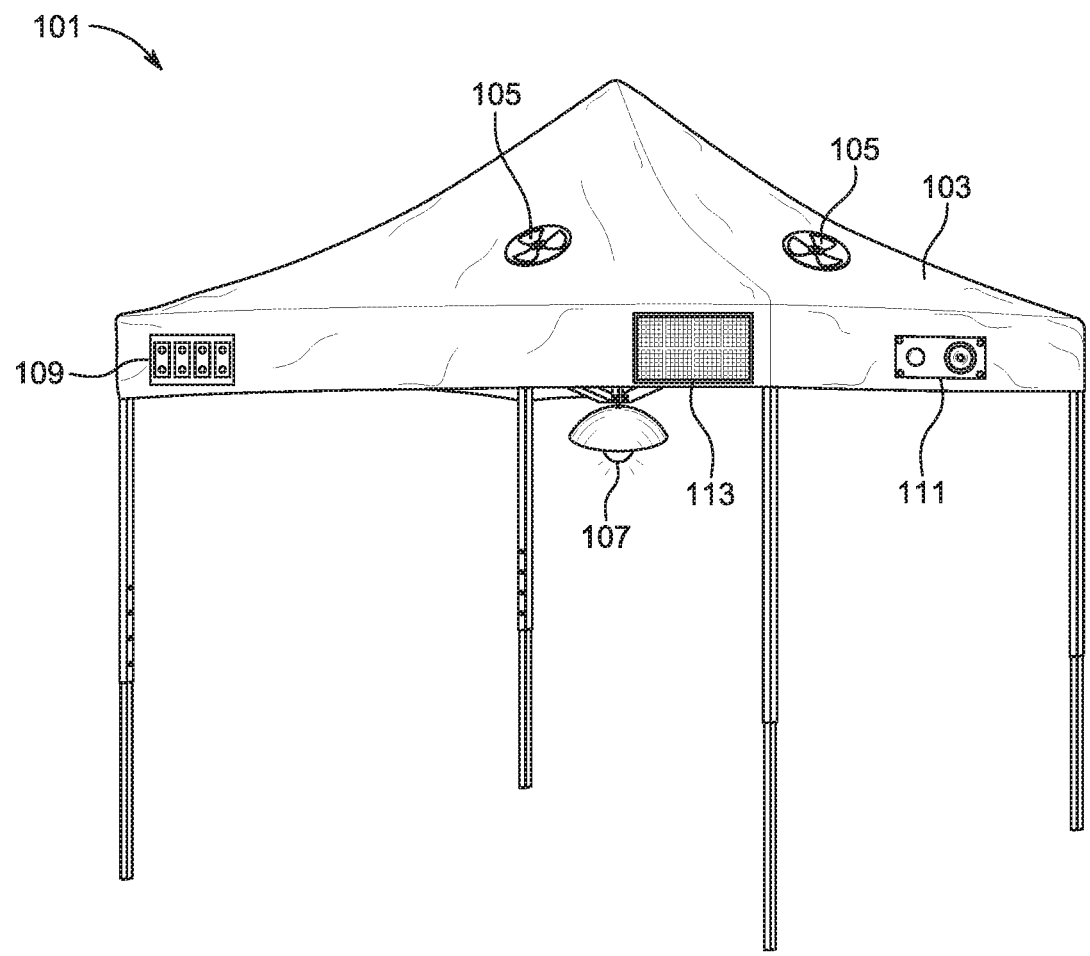
FIG. 1 is a schematic of a canopy system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use in accordance with the present application overcomes one or more of the above-discussed problems commonly associated with conventional canopy systems. Specifically, the system of the present invention provides for a canopy that utilizes solar power to supply energy to fans built within the canopy to provide cooling action and improved comfort for a user. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic of a canopy system in accordance with a preferred embodiment of the present application. It will be appreciated that system 101 overcomes one or more of the above-listed problems commonly associated with conventional canopy systems.

In the contemplated embodiment, system 101 includes a canopy 103 configured for outdoor use to provide shade or shelter from weather conditions such as sunlight, wind, hail, snow, and rain. The canopy 103 includes one or more fans 105 configured to deliver cool air thereunder. It should be appreciated that the canopy 103 can vary in shape, size, and style. In addition, it should be appreciated that the canopy 103 is configured to be flexible, durable, and weatherproof for easy transportability and to further provide shelter for the user. Furthermore, the canopy includes one or more lights 107 configured to provide lighting thereunder.

System 101 also includes any electrical feature to further the comfort and enjoyment of the user such as one or more electrical outlets 109 and one or more speakers 111. For example, a user can use the electrical outlets to charge his or her mobile devices, to power a television, and to power additional lights underneath the canopy. In another example, a user can connect his or her mobile device to the speakers to via Bluetooth or other suitable means to play audio from his or her mobile device.

System 101 also includes one or more solar panels 113 which stores and supplies solar energy to the electrical components of the canopy 103 such as the fans 105, the lights 107, the electrical outlets 109, and speakers 111. It should be appreciated that the solar panels 113 may attach to any part of the canopy 103 or any component of the canopy 103 such as on the material the canopy is made from or on the back of the fans 105. In addition, it should be appreciated that system 101 can include an alternative power source the event of power failure of the solar panels 113 such as batteries, a power generator, or the like.

It should also be appreciated that one of the unique features believed characteristic of the present application is the configuration of the canopy that utilizes solar panels to store and supply energy to the electrical components thereof.

Figure 2:
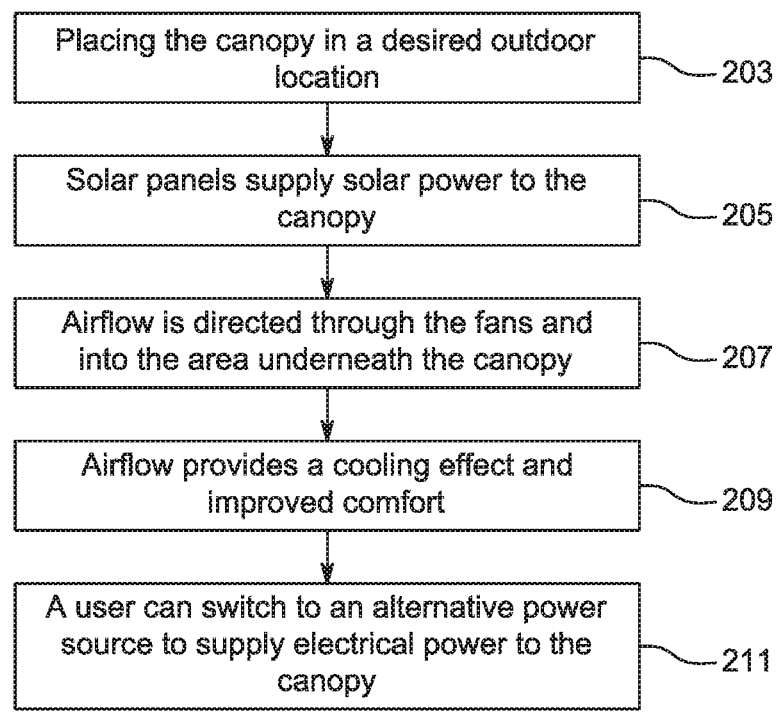
FIG. 2 is a flowchart of a method of use of a canopy system in accordance with the present application.

In FIG. 2, a flowchart 201 depicts a simplified method of use associated with system 101. During use, the canopy is placed in a desired outdoor location, as shown with box 203. Solar panels then supply solar power to the canopy, as shown with box 205. While airflow is directed through the fans and into the area underneath the canopy, airflow provides a cooling effect and improved comfort, as shown with boxes 207, 209. A user can switch to an alternative power source to supply electrical power to the canopy, as shown with box 211.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A canopy system, comprising:
 a canopy configured to provide shade and shelter, the canopy having:
  a body having an inner surface and an outer surface, the body enclosing an area;
  one or more fans secured to the body and configured to direct air passing over the outer surface to the area enclosed by the body;
  one or more lights;
  one or more electrical outlets secured to the outer surface of the body; and
  one or more speakers;
  wherein the lights provide lighting underneath the canopy;
  wherein the electrical outlets provide power to a user therein; and
  wherein the speakers provide audio entertainment to a user; and
 one or more solar panels configured to store and supply solar energy;
 wherein the solar panels are coupled to the canopy; and
 wherein the solar panels are configured to power the fans, lights, electrical outlets, and speakers.

2. The system of claim 1, wherein the canopy is flexible, durable, and weatherproof.

3. The system of claim 1, further comprising:
 at least one alternative power source, the alternative power source configured to enable a user to switch between the solar panels and the alternative power source to deliver energy therefrom to power the fans, lights, electrical outlets, and speakers.

4. A method of cooling, the method comprising:
 providing the system of claim 1;
 positioning the canopy in an outdoor location; and
 using the solar panels to power the fans such that airflow is directed underneath the canopy.

* * * * *